April 28, 1970  R. C. HOPKINS ET AL  3,508,830
APPARATUS FOR LIGHT SCATTERING MEASUREMENTS
Filed Nov. 13, 1967  2 Sheets-Sheet 2
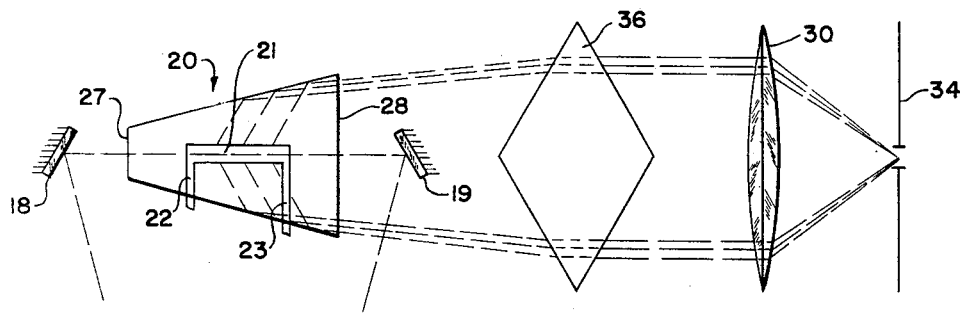
FIG. 3
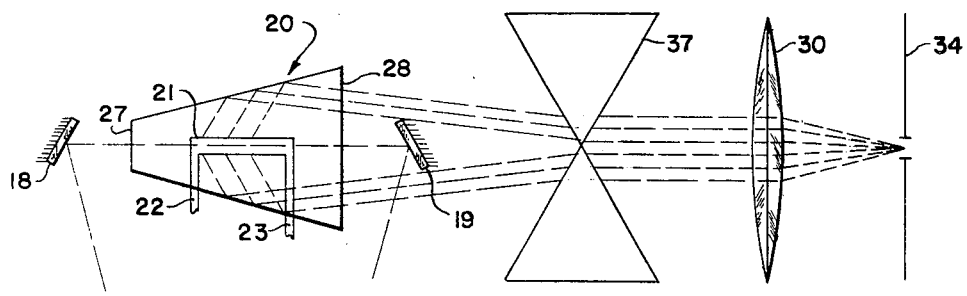
FIG. 4
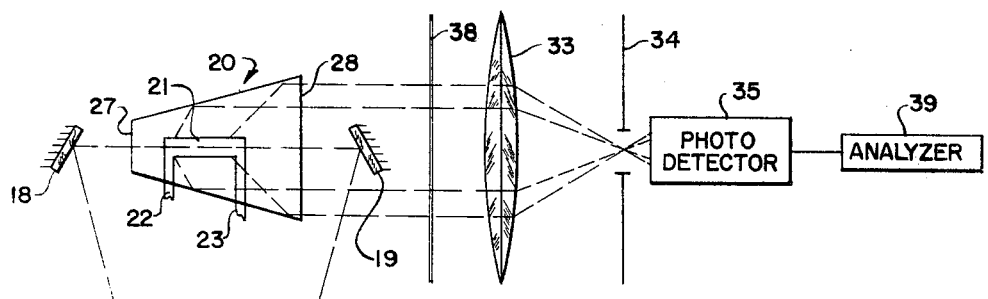
FIG. 5
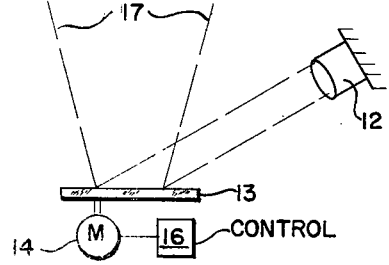
INVENTORS:
ROBERT C. HOPKINS
SAMUEL M. BRASSINGTON
GEORGE J. HECHT
BY: *Louis J. Bovasso*
THEIR ATTORNEY

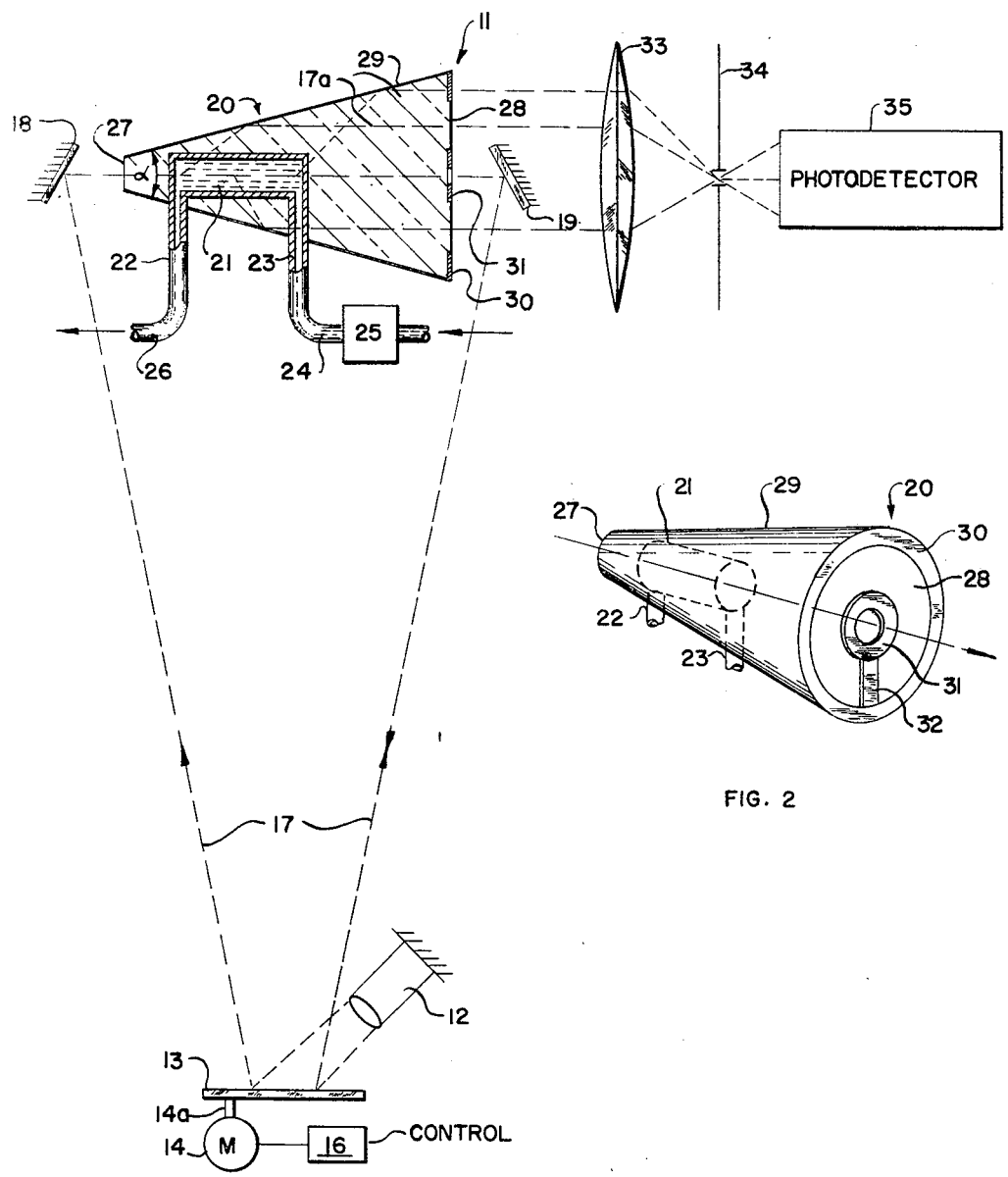

United States Patent Office 3,508,830
Patented Apr. 28, 1970

1

3,508,830
APPARATUS FOR LIGHT SCATTERING
MEASUREMENTS
Robert C. Hopkins, Kensington, Samuel M. Brassington,
Concord, and George J. Hecht, El Cerrito, Calif., assignors to Shell Oil Company, New York, N.Y., a corporation of Delaware
Filed Nov. 13, 1967, Ser. No. 682,464
Int. Cl. G01n 21/00
U.S. Cl. 356—103                                    15 Claims

ABSTRACT OF THE DISCLOSURE

The intensity of light scattered from a liquid solution is determined by passing the beam of an exciting light source through a liquid disposed in a cylindrical cavity coincident with the longitudinal axis of a transparent conical cell. The rays of light scattered from the solution are reflected off the conical surface of the cell and pass out through the base of the cell. These rays are then focused through an aperture and onto a device for measuring the intensity of the rays.

BACKGROUND OF THE INVENTION

Field of the invention

This invention relates to the measurement of light; more particularly, it relates to apparatus for the measurement of the intensity, polarization and spectrum of light scattered from a pure liquid, solution or a gas.

Description of the prior art

The measurement of the intensity of the light scattered by dilute solutions has been explored in many laboratories and the design and construction of a great variety of instruments have been described. Basically, all types consist of a light source, a collimation system for the incident beam, a cell containing the liquid, a collimation system for the scattered light, a photodetector and a measuring device to record the signal.

The simplest and most usual solution to the problem of measuring the angular distribution of the scattered light has been to move the photo-detector in an arc around the cell containing the liquid while keeping the light source and sample fixed. When large 11-stage photomultipliers are used, this becomes quite difficult.

Several important characteristics are required in the exciting light source. First of all, it must be highly monochromatic since the angular distribution of scattered light from the sample is strongly dependent on the wavelength of the exciting light. Thus, a light source having a broad spectrum would result in overlapping angular distributions of the various scattered light frequencies.

Secondly, the exciting light source must be very intense. Since the scattered light intensity is proportional to the exciting light intensity, and since only a very small fraction of the incident light is scattered, an intense source is needed to obtain a detectable scattered intensity. An additional requirement is that the intensity of the light source must be well stabilized.

Finally, the exciting light source must be well collimated. In order for precise angular measurements of the scattered light to be made, the direction of the incident beam must be very well defined (i.e., well collimated). The collimation of the incident light intersecting with the collimated field of view of the detector defines the volume of liquid observed. It is necessary to maintain the image constant in size, shape and uniformity even when the volume observed changes. The entry of light into the viewing area from stray reflections in the cell must be avoided.

Thus, a conventional prior art apparatus uses a mercury-arc lamp as an exciting light source together with necessary filters and collimating optics to meet these requirements. Relatively large sample volumes are required to avoid interference from cell wall reflections and prior art devices of this type are unsuitable for use with flowing samples.

Although light scattered at a given angle with respect to the direction of the incident beam consists of a full cone of light rays about the incident beam path, conventional instruments observe only a small segment or filament from this cone of scattered light. The angular discrimination of the scattered light is limited by collimation of both the exciting light and the detector field of view. Finally, such conventional light scattering apparatuses of the prior art are relatively expensive.

SUMMARY OF THE INVENTION

It is an object of this invention to provide apparatus which can be used to measure the light scattered from a relatively small sample volume flowing in a continuous process.

It is a further object of this invention to provide light scattering apparatus which, with a fixed light source and a photodetector, can detect light scattered at two different angles.

It is a still further object to provide such light scattering apparatus which does not require filters or collimating optics for the source.

It is still another object to provide light scattering apparatus which can collect the full cone of rays scattered at a given angle about the same axis and over the full sample length.

The invention is realized by passing an exciting light source, such as a laser beam, through a liquid sample in a cavity disposed along the longitudinal axis of a conically-shaped transparent scattering cell. The rays of light scattered by the liquid sample are reflected off the conical cell surface and pass out through the base of the cell. The rays are then focused and the intensity thereof is measured.

This invention is particularly adaptable for the continuous measurement of average molecular weights of polymers or other large molecules dissolved in small volumes of solution. For example, the apparatus of this invention can be used as a detector for gel permeation chromatography. Commercial process applications include its use as a continuous stream analyzer for polymer production.

BRIEF DESCRIPTION OF THE DRAWING

FIGURE 1 is a diagrammatic view of a preferred embodiment of the invention;

FIGURE 2 is an isometric view of an element of FIGURE 1; and

FIGURES 3 through 5 are diagrammatic views of alternate embodiments of the apparatus of FIGURE 1; in the embodiments of FIGURES 3 and 4, parts are omitted for convenience of illustration.

DESCRIPTION OF THE PREFERRED EMBODIMENTS

Referring to FIGURE 1, the apparatus 11 includes a source 12 of highly collimated, monochromatic, intense exciting light, such as a laser beam. Of course, a conventional light source, such as a mercury-arc lamp, could be used. However, the use of a laser eliminates the necessity for filters and collimating optics, as required for conventional light sources, while simultaneously providing much higher intensities.

Source 12 is preferably angled so as to direct the light rays exiting therefrom onto the reflecting surface of a reflector, such as a mirror 13. A prime mover means, such as an electric motor 14, operatively engages mirror 13. Motor 14 is coupled to mirror 13 so as to rotate or otherwise move the mirror 13 upon actuation of motor 14 as will be described in detail hereinbelow. Of course, any prime mover means, electrical or mechanical, pneumatic or hydraulic, can be used to control mirror 13. Conventional control means 16 operatively engages motor 14 for actuating the motor 14. Further, in place of mirror 13 and motor 14, the source 12 can be deflected by using electro-optical effects, such as the Pockel's effect or, alternatively, acousto-optical effect, such as Bragg diffraction, as is well known in optics art.

It can be seen in FIGURE 1 that source 12 can be fixed in position and mirror 13 angled so as to direct the light rays 17 from source 12 onto either mirror 18 or 19. Mirrors 18 and 19 are also fixed with relation to cell 20. Of course, light source 12 could be movable with mirror 13 fixed in position, if desired. Mirrors 18 and 19 are so angled as to pass any light rays directed thereon from mirror 13 through cell 20 along its longitudinal axis as will be described further hereinbelow.

Scattering cell 20, best seen in FIGURE 2, preferably comprises a solid conically-shaped piece of transparent material, such as glass. Cell 20 has a preferably cylindrical chamber or cavity 21 along its longitudinal axis. Similar results may be obtained with cell cavities having cross-sectional areas other than circular; however, the concepts of this invention are best carried out with a cell having a cavity with a circular, or substantially circular, cross-sectional area (i.e., substantially cylindrical). In like manner, cell 20 is preferably solid but may be hollow, as, for example, a hollow aluminum cone with the cavity fixed along the longitudinal axis of the aluminum cone. However, one disadvantage of this type of cone is that rays which might ordinarily pass out of the solid cell would be reflected back into the cell. Accordingly, a solid cell is preferred. Cavity 21 is adapted to hold therein a liquid solution desired to be analyzed. For this reason, cavity 21 includes an inlet flow port 22 and an outlet flow port 23. Inlet flow port 22 communicates with a first branch portion 24 (FIGURE 1) in communication with a flow controller 25. A second branch portion 26 extends from outlet flow port 23. In this manner, the liquid solution can be continuously flowed through cavity 21 and the branch portions 24 and 26 can be a series element of an external flow system.

In other words, it can be seen that a liquid flowing within a continuous process can be diverted into flow controller 25 and thus into cavity 21, thereby enabling the light scattering properties of the liquid to be measured without the necessity for shutting down the equipment.

The scattering cell 20 (FIGURE 2) comprises an apex 27, a base 28 and a conical surface 29. Apex 27 refers to the narrowed end of cell 20 which may be substantially pointed or flattened, as illustrated in FIGURE 1. The surfaces 28 and 29 are preferably covered with an anti-reflection coating, such as magnesium fluoride, of a thickness suitable for the particular exciting light wavelength. A mask 30 extends about the periphery of base 28 to block any interfering light rays scattered from the base end of cavity 21. Mask 30 is preferably black paint, dense black glass or other opaque material. The central position of base 28 is similarly covered by a mask 31, a portion thereof being free of any covering so as to permit the rays of exciting light to be directed along the longitudinal axis of cell 20 and out the center of base 28. Mask 31 blocks any interfering light rays scattered from the apex end of cavity 21. A mask portion 32 also extends from mask 31 to mask 30 as can be seen in FIGURE 2. This portion 32 is aligned with flow ports 22 and 23 so as to block any rays scattering therefrom.

Focusing means, such as a substantially aberration-free focusing lens 33, is located in the path of the light rays exiting from base 28 as will be described further hereinbelow. Lens 33 is used to focus those scattered light rays 17a which propagate parallel to the cell axis through the base 28 of cell 20. An aperture 34 is disposed at the focus of lens 33 so as to transmit only the parallel rays focused by lens 33. A photodetector or any suitable light intensity measuring means, such as a photomultiplier or photodiode 35, receives the rays from aperture 34 and measures the intensity of the light transmitted through the aperture. Thus, the combination of lens 33 and aperture 34 effectively filters out only the parallel rays emerging from base 28 and allows them to be detected by the photodetector.

In operation, light emitted from light source 12 is directed onto mirror 13. Mirror 13 is selectively moved, as, for example, by moving motor shaft 14a vertically, thereby changing the angle of mirror 13, so as to direct rays 17 onto either mirror 18 or mirror 19. For example, assume that mirror 13 is adjusted by means of motor 14 so that rays 17 originating from source 12 are directed to mirror 18. The light incident on mirror 18 is reflected through the apex 27 and down the axis of cell 20 and passes through the sample cavity 21 which contains a liquid solution. After exiting from cavity 21, the exciting light passes out the base 28 of the cell 20 and is directed away from the cell 20 by mirror 19. If angle $\alpha$ is defined as the full apex angle of the conical cell 20 (see FIGURE 1), then this geometry of the apparatus 11 is such that only light rays scattered from the liquid solution in cavity 21 at angle $\alpha$ with respect to the forward propagation direction of the exciting light pass out through the cell base 28 parallel to the exciting light direction. Light rays scattered at other angles which pass through base 28 are refracted and consist of either converging or diverging rays.

The fluid in cavity 21 may be either static or flowing. In the former case, the input and output into cavity 21 can be sealed by conventional means to retain the liquid solution therein. In the latter case, the liquid solution can be flowed through cavity 21 by means of flow controller 25 as is well known in the art.

Some of the exciting light rays 17 will be scattered while passing through the liquid solution in cavity 21. Any light which is scattered from the liquid solution and approaches conical surface 29 at an angle greater than the critical angle, by definition, is totally reflected and passes out through the base 28 of cell 20. Any light approaching surface 29 at an angle less than the critical angle passes through surface 29, out of cell 20, and is not detected. The critical angle is determined by the index of refraction of the material from which the cell 20 is made and is defined according to the following: the tangent function of the critical angle is equal to the index of refraction of the cell material, assuming that the cell 20 is operated in a medium having a unit index of refraction (e.g., air).

As can be seen in FIGURE 1, the rays 17 are directed by mirror 18 through the liquid solution within cavity 21. These rays are scattered by the solution as discussed previously and reflect off the conical cell surface 29. The rays scattered at angle $\alpha$ then pass out of base 28 parallel to the longitudinal axis of cell 20.

The aberration-free lens 33 focuses the rays scattered parallel to the cell axis onto aperture 34 which is disposed at the focus of lens 33. Aperture 34 permits the focused rays to pass through to photodetector 35 where their intensity is measured as is well known in the art.

The foregoing description of the operation of apparatus 11 describes a method of detecting light scattered from the liquid solution at angle $\alpha$. By reversing the direction of the exciting light, apparatus 11 detects light scattered at an angle $180°-\alpha$. This is accomplished by moving mirror 13 so that rays 17 are directed to mirror 19 which reflects the incident light through cell 20 and cavity 21 in the opposite direction. Upon exiting from cell 20, the exciting light is directed away from the cell by mirror 18. In this alternate light path configuration, the geometry of the cell is such that only light scattered at an angle of $180°-\alpha$ from the fluid in cavity 21 will be collected by lens 33 and detected by photodetector 35 after passing through aperture 34. Thus, by reversing the direction of propagation of the exciting light, scattered light at a second angle, $180°-\alpha$, can be investigated with the same cell.

By adding a circular lens having one of the cross-sections (36 or 37) illustrated in FIGURES 3 and 4, two other angles of light scattering may be detected from the same conical cell. For example, referring more particularly to FIGURE 3 wherein like elements refer to like parts of FIGURE 1, a lens 36 of diamond-shaped cross-section is disposed between focusing lens 33 and cell 20. Lens 36 collimates those rays exiting from base 28 which were scattered from the liquid in cavity 21 at an angle greater than the cone apex angle $\alpha$. Of course, lens 36 is selected to collimate rays of a particular angle of interest; lens 37 of hour-glass cross-section in FIGURE 4, for example, would collimate light rays scattered at an angle less than $\alpha$.

In a preferred embodiment of the invention, illlustrated in FIGURE 5, a linear or circular polarizer 38 may be disposed between the base 28 of cell 20 and the lens 33 for obtaining information on the polarization of light scattered from cell 20. Also, a dispersing instrument such as a monochromator or other type of spectrometer, such as spectrum analyzer 39, can be operatively engaged with photodetector 35 for observing the spectrum of the scattered light. Further, by using methods of optical heterodyne detection well known in the optics art, a very narrow spectrum can be observed with high resolution.

We claim as our invention:

1. Apparatus for determining light scattered from a fluid measured with respect to the direction of propagation of the exciting light, the apparatus comprising:
   an exciting light source;
   a substantially conically-shaped transparent scattering cell having an anti-light reflection surface, an apex, and a base;
   a substantially cylindrical chamber disposed along the longitudinal axis of the cell adapted to contain therein a sample of the fluid;
   both said cell and said chamber being composed of material having substantially the same index of refraction;
   light-directing means cooperating with said cell for directing rays of light from the light source through the chamber within the cell and along the longitudinal axis of the cell whereby rays of light scattered by the solution within the chamber are reflected from the conical surface of the cell and out the base of the cell;
   substantially aberration-free lens focusing means positioned adjacent to the base of said cell and adapted to focus the light rays exiting through the base of the cell;
   aperture means disposed adjacent to the focus of the lens focusing means so as to transmit only the rays parallel to the cell axis focused by the lens; and
   intensity-measuring means associated with the aperture means for measuring the intensity of the focused light rays transmitted through the aperture means.

2. The apparatus of claim 1 wherein the exciting light source is a highly collimated, monochromatic, intense exciting light.

3. The apparatus of claim 1 wherein the scattering cell is a solid having masking means positioned about both the periphery of its base and about the central portion of the base, a portion of the masked central portion being free of masking means so as to permit rays of light parallel to the longitudinal axis of the cell to be transmitted through the base.

4. The apparatus of claim 1 wherein the light-directing means includes reflecting mirror means positioned so as to reflect the rays of light from the light source through the apex of the cell, through the chamber and out the base of the cell.

5. The apparatus of claim 1 wherein the light-directing means includes reflecting mirror means positioned so as to reflect the rays of light from the light source, through the base of the cell, through the chamber and out the apex of the cell.

6. The apparatus of claim 1 wherein the light-directing means includes a first reflecting mirror means positioned so as to intercept the rays of light from the light source:
   second reflecting mirror means positioned so as to reflect the rays of light from the light source through the base of the cell, through the chamber and out the apex of the cell;
   third reflecting mirror means positioned so as to reflect the rays of light from the light source, through the apex of the cell, through the chamber and out the base of the cell; and
   said first mirror means being movable into selective reflective engagement with said second and third mirror means so as to divert the rays of light from the light source through either the apex or the base of the cell.

7. The apparatus of claim 1 wherein the intensity measuring means is a photodetector.

8. The apparatus of claim 1 wherein the chamber includes inlet and outlet liquid solution flow ports communicating with the interior of said chamber.

9. The apparatus of claim 1 wherein said cell is so configured as to scatter through the base of the cell only those rays that are at the same angle to the direction of the exciting light path as the apex angle of the cell.

10. The apparatus of claim 9 wherein the lens focusing means includes first lens means disposed between the base of the cell and the aperture means adapted to render any rays slightly deviating from the apex angle of the cell emanating from the base of the cell parallel to the longitudinal axis of the cell; and
   second aberration-free lens means disposed between said first lens means and said aperture means for focusing the parallel rays emanating from said first lens means.

11. The apparatus of claim 1 including polarizing means disposed between the base of the cell and the lens focusing means for measuring the polartity of light rays scattered by the cell and passing through the base of the cell.

12. The apparatus of claim 1 wherein the intensity measuring means includes spectrum analyzing means for observing the spectrum of the light rays transmitted through the aperture means.

13. A light-scattering cell for use in determining the light scattered from a fluid comprising:
   a substantially conically shaped transparent cell having an anti-light reflection surface, an apex and a base; and a substantially cylindrical chamber disposed along the longitudinal axis of said cell.

14. The cell of claim 13 wherein said cell is a solid having said chamber formed therein; and inlet and outlet passageways formed in said cell extending outwardly of said surface and communicating with the interior of said chamber.

15. The cell of claim 14 including masking means positioned about both the periphery of said base and about the central portion of said base, a center segment of said central portion being free of masking means.

References Cited

UNITED STATES PATENTS 2,839,963   6/1958   Moss et al.
3,417,251  12/1968   Leonard et al.

RONALD L. WIBERT, Primary Examiner

R. J. WEBSTER, Assistant Examiner

U.S. Cl. X.R.

250—218, 435; 356—208